(12) United States Patent
Huston et al.

(10) Patent No.: US 8,517,423 B1
(45) Date of Patent: Aug. 27, 2013

(54) MODULAR FRAME STRUCTURE FOR OFF ROAD VEHICLE

(75) Inventors: Steven P. Huston, Martinez, GA (US); Roy L. Woodard, Statesboro, GA (US)

(73) Assignee: Club Car, LLC, Evans, GA (US)

( * ) Notice: Subject to any disclaimer, the term of this patent is extended or adjusted under 35 U.S.C. 154(b) by 0 days.

(21) Appl. No.: 13/424,905

(22) Filed: Mar. 20, 2012

(51) Int. Cl.
*B62D 21/02* (2006.01)

(52) U.S. Cl.
USPC ...... 280/785; 280/781; 296/203.02; 296/204; 296/187.01

(58) Field of Classification Search
USPC .................. 280/781, 785; 296/203.01, 204, 296/203.02, 203.04, 187.01, 205
See application file for complete search history.

(56) References Cited

U.S. PATENT DOCUMENTS

| | | | | |
|---|---|---|---|---|
| 1,475,332 A * | 11/1923 | Wales | ......................... | 280/790 |
| 1,581,931 A * | 4/1926 | Lamplugh | ..................... | 296/205 |
| 1,609,850 A * | 12/1926 | Weymann | ............... | 296/203.01 |
| 2,239,089 A * | 4/1941 | Fageol | .................... | 296/203.01 |
| 2,389,907 A * | 11/1945 | Helmuth | ................. | 296/203.01 |
| 2,507,421 A * | 5/1950 | Rose | ............................ | 180/217 |
| 3,374,029 A * | 3/1968 | Barker | ......................... | 296/205 |
| 3,780,469 A | 12/1973 | Hancovsky | | |
| 3,804,455 A * | 4/1974 | Gorski | .......................... | 296/205 |
| 4,045,075 A * | 8/1977 | Pulver | ........................... | 296/205 |
| 4,422,685 A | 12/1983 | Bonfilio et al. | | |
| 4,533,172 A | 8/1985 | Oliver | | |
| 4,676,545 A | 6/1987 | Bonfilio et al. | | |
| 4,676,762 A | 6/1987 | Ballard | | |
| 4,950,026 A * | 8/1990 | Emmons | .................. | 296/203.01 |
| 5,094,313 A * | 3/1992 | Mauws | ......................... | 180/210 |
| 5,320,403 A * | 6/1994 | Kazyak | ..................... | 296/203.01 |
| 5,332,281 A * | 7/1994 | Janotik et al. | ................. | 296/209 |
| 5,343,666 A | 9/1994 | Haddad et al. | | |
| 5,401,056 A | 3/1995 | Eastman | | |
| 5,823,569 A | 10/1998 | Scott | | |
| 5,833,269 A * | 11/1998 | Gastesi | ........................ | 280/785 |
| 6,003,935 A | 12/1999 | Kalazny | | |
| 6,082,810 A * | 7/2000 | Bennett | ...................... | 296/184.1 |
| 6,126,506 A | 10/2000 | Rudy | | |
| 6,315,325 B1 | 11/2001 | Dunn | | |
| 6,533,348 B1 * | 3/2003 | Jaekel et al. | .................. | 296/205 |
| 6,588,536 B1 * | 7/2003 | Chiu | ............................ | 180/312 |

(Continued)

FOREIGN PATENT DOCUMENTS

EP 311849 A1 * 4/1989
FR 2873335 A1 1/2006

(Continued)

OTHER PUBLICATIONS

PCT/US2013/031160 International Search Report and Written Opinion date mailed May 6, 2013 (10 pages).

*Primary Examiner* — Nicole Verley
(74) *Attorney, Agent, or Firm* — Michael Best & Friedrich LLP

(57) ABSTRACT

A frame assembly for an off-road vehicle including a left frame rail and a right frame rail that are identical to each other, a front frame module that includes at least one left foot and at least one right foot, an occupant frame module that includes at least one left foot and at least one right foot, a rear frame module that includes at least one left foot and at least one right foot, and a plurality of identical adapters mounting the components to the left and right frame rails.

14 Claims, 9 Drawing Sheets

(56) References Cited

U.S. PATENT DOCUMENTS

| | | | |
|---|---|---|---|
| 6,623,067 B2 * | 9/2003 | Gabbianelli et al. | 296/205 |
| 6,665,935 B2 | 12/2003 | Panoz | |
| 6,677,050 B2 | 1/2004 | Guetlbauer et al. | |
| 6,726,436 B2 | 4/2004 | Schaffner et al. | |
| 6,886,884 B2 * | 5/2005 | Bull et al. | 296/187.08 |
| 6,957,845 B2 * | 10/2005 | Rager | 296/146.9 |
| 7,300,536 B1 * | 11/2007 | Wang et al. | 156/274.8 |
| 7,303,033 B2 * | 12/2007 | Chernoff et al. | 180/65.8 |
| 7,325,866 B2 * | 2/2008 | Horton et al. | 296/205 |
| 7,347,490 B2 * | 3/2008 | Kobayashi et al. | 296/204 |
| 7,503,623 B2 * | 3/2009 | Favaretto | 296/203.01 |
| 7,543,672 B2 * | 6/2009 | Codere et al. | 180/210 |
| 7,677,343 B2 * | 3/2010 | Kitai et al. | 180/89.17 |
| 7,762,616 B2 * | 7/2010 | Smith et al. | 296/184.1 |
| 7,766,388 B1 | 8/2010 | Marino et al. | |
| 7,802,816 B2 * | 9/2010 | McGuire | 280/788 |
| 8,029,021 B2 * | 10/2011 | Leonard et al. | 280/785 |
| 8,051,935 B2 * | 11/2011 | Clapp | 180/117 |
| 8,141,904 B2 * | 3/2012 | Akaki et al. | 280/784 |
| 8,205,910 B2 * | 6/2012 | Leonard et al. | 280/781 |
| 2001/0000119 A1 * | 4/2001 | Jaekel et al. | 296/29 |
| 2007/0084656 A1 * | 4/2007 | Chang | 180/208 |
| 2007/0256880 A1 * | 11/2007 | Ball | 180/311 |
| 2007/0256881 A1 * | 11/2007 | Ball et al. | 180/312 |
| 2009/0188100 A1 * | 7/2009 | Durney et al. | 29/469 |
| 2009/0236877 A1 | 9/2009 | Peschansky et al. | |
| 2009/0267337 A1 * | 10/2009 | Siekaup et al. | 280/781 |
| 2010/0244497 A1 * | 9/2010 | Honda et al. | 296/205 |

FOREIGN PATENT DOCUMENTS

| | | | |
|---|---|---|---|
| GB | 2131361 A | * | 6/1984 |
| GB | 2299310 A | | 10/1996 |
| WO | 2009034376 A1 | | 3/2009 |

* cited by examiner

MODULAR FRAME STRUCTURE FOR OFF ROAD VEHICLE

BACKGROUND

The present invention relates to a vehicle frame. More specifically the invention relates to a modular frame for a vehicle.

Vehicle frames are often custom designed and fabricated including a large number of individual and unique components. The frames are typically welded together to form a single frame body.

SUMMARY

In one embodiment, the invention provides a frame assembly for an off-road vehicle. The frame assembly includes a left frame rail and a right frame rail. The left and right frame rails are identical to each other, and each of the left and right frame rails has a base portion and a mating structure. Each of the left and right frame rails is straight and extends along respective left and right longitudinal axes, such that the left and right frame rails each have a constant cross-section along its entire length. The frame assembly also includes a plurality of identical adapters mounted to the left and right frame rails. Each adapter includes a mounting surface and a receiving structure that receives the mating structure of one of the frame rails. The frame assembly also includes a front frame module that includes at least one left foot and at least one right foot. The at least one left foot of the front frame module is mounted to the mounting surface of an adapter mounted to the left frame rail, and the at least one right foot of the front frame module is mounted to the mounting surface of an adapter mounted to the right frame rail. The frame assembly also includes an occupant frame module that includes at least one left foot and at least one right foot. The at least one left foot of the occupant frame module is mounted to the mounting surface of an adapter mounted to the left frame rail, and the at least one right foot of the occupant frame module is mounted to the mounting surface of an adapter mounted to the right frame rail. The frame assembly further includes a rear frame module that includes at least one left foot and at least one right foot. The at least one left foot of the rear frame module is mounted to the mounting surface of an adapter mounted to the left frame rail, and the at least one right foot of the rear frame module is mounted to the mounting surface of an adapter mounted to the right frame rail.

In another embodiment the invention provides an off-road vehicle including left and right identical, straight frame rails arranged parallel to each other, each of the left and right frame rails including a front portion, a middle portion, and a rear portion. A plurality of identical adapters are mounted to each of the left and right frame rails and are positioned along the length of the frame rails at selected positions within each of the front portions, middle portions, and rear portions. A front frame module is mounted to the adapters in the front portions of the left and right frame rails, a rear frame module is mounted to the adapters in the rear portions of the left and right frame rails, and an occupant frame module is mounted to the adapters in the middle portions of the left and right frame rails. A front suspension assembly is mounted to the adapters in the front portions of the left and right frame rails, and a rear suspension assembly that is identical to the front suspension assembly is mounted to the adapters in the rear portions of the left and right frame rails.

In another embodiment the invention provides a method of assembling a vehicle frame. The method includes providing a plurality of identical frame rails, with each frame rail including a base portion having a section modulus and a mating portion on top of the base portion. The method also includes providing a plurality of identical adapters, with each adapter having a mounting surface and a receiving structure adapted to receive the mating structure of the frame rails. The method also includes providing identical front and rear frame modules and providing symmetrically identical front and rear suspension assemblies. The method also includes selecting left and right frame rails, positioning the left and right frame rails parallel to each other with the mating portions above the base portions, mounting a plurality of the adapters to the mating portions of the left and right frame rails, mounting the front frame module to the adapters on the left and right frame rails, mounting the rear frame module to the adapters on the left and right frame rails, mounting an occupant frame module to the adapters on the left and right frame rails, mounting the front suspension assembly to the adapters on the left and right frame rails, and mounting the rear suspension assembly to the adapters on the left and right frame rails.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

In the context of this application, the word "identical" will be understood to represent separate elements that are produced in the same fashion to provide separate elements with the same features, dimensions, specifications, and components. In other words, two identical elements are interchangeable duplicates of one another. Further, several reference directions and planes will be discussed throughout the following description. The terms front, rear, left, and right hold there common meaning throughout the following description. That is to say, if one were sitting in the driver's seat of the vehicle hereafter described, the front of the vehicle would be ahead, the rear of the vehicle behind, the left of the vehicle to the left, and the right of the vehicle to the right. A longitudinal center plane is defined as a vertical plane (i.e., perpendicular to the ground) that extends from the front to the rear through the center of the vehicle. A transverse center plane is defined as a vertical plane (i.e., perpendicular to the ground) that extends from the left to the right through the center of the vehicle and is perpendicular to the longitudinal center plane.

Figure 1:
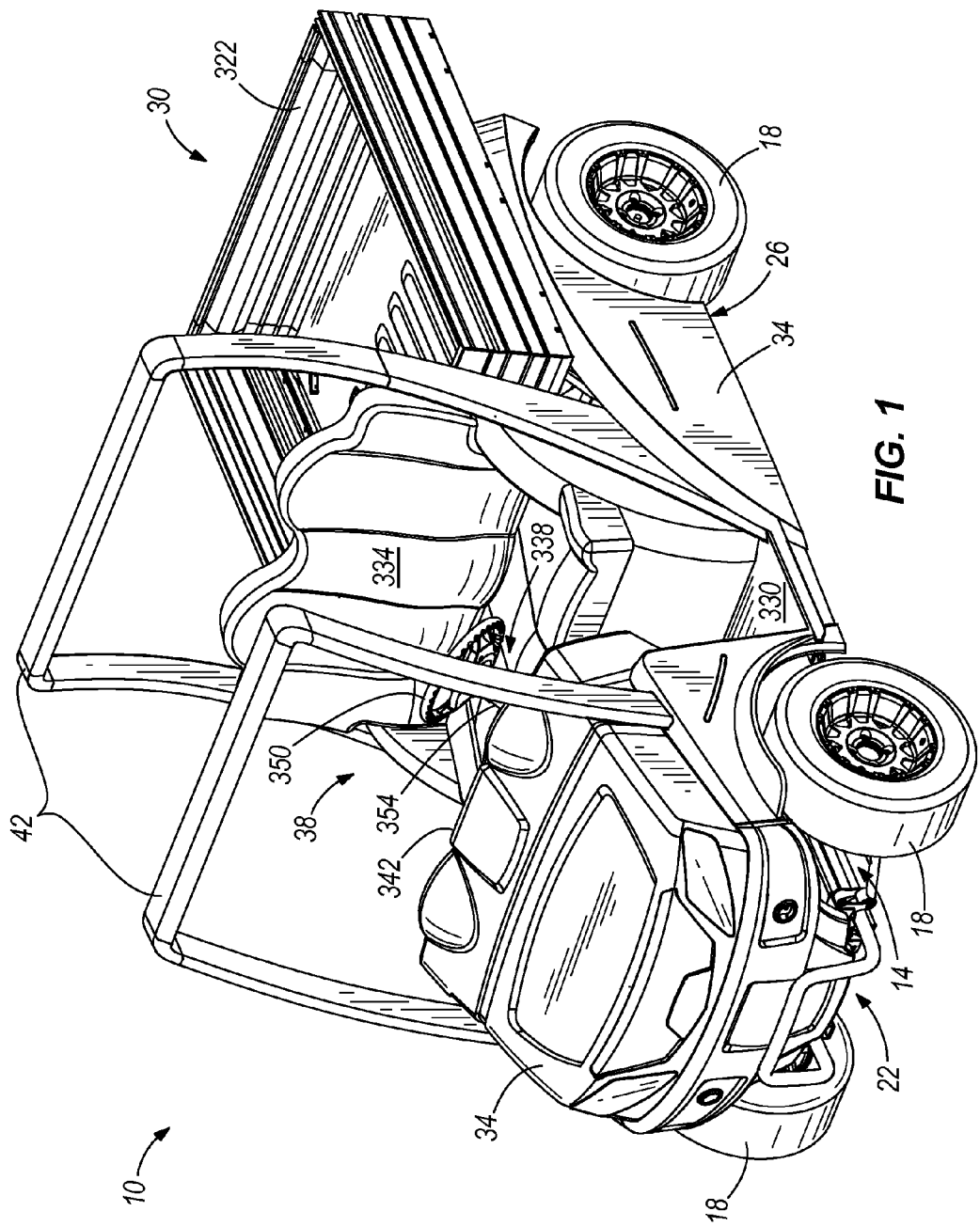
FIG. 1 is a perspective view of a vehicle according to the invention.

FIG. 1 shows a vehicle 10 in the form of a utility vehicle. The vehicle 10 includes, a frame 14, four wheels 18, a front suspension assembly 22 that connects the front wheels 18 to the frame 14, a rear suspension assembly 26 that connects the rear wheels 18 to the frame 14, a cargo bed assembly 30 mounted to the frame 14, a shell 34 mounted to and surrounding portions of the frame 14, an occupant interface 38, and roll bars 42. The vehicle 10 further includes an energy source (e.g., a battery, fuel, etc.), a prime mover, a drive train, and other features common to such vehicles. One skilled in the art will understand that the vehicle 10 may include features not described in detail herein.

Figure 2:
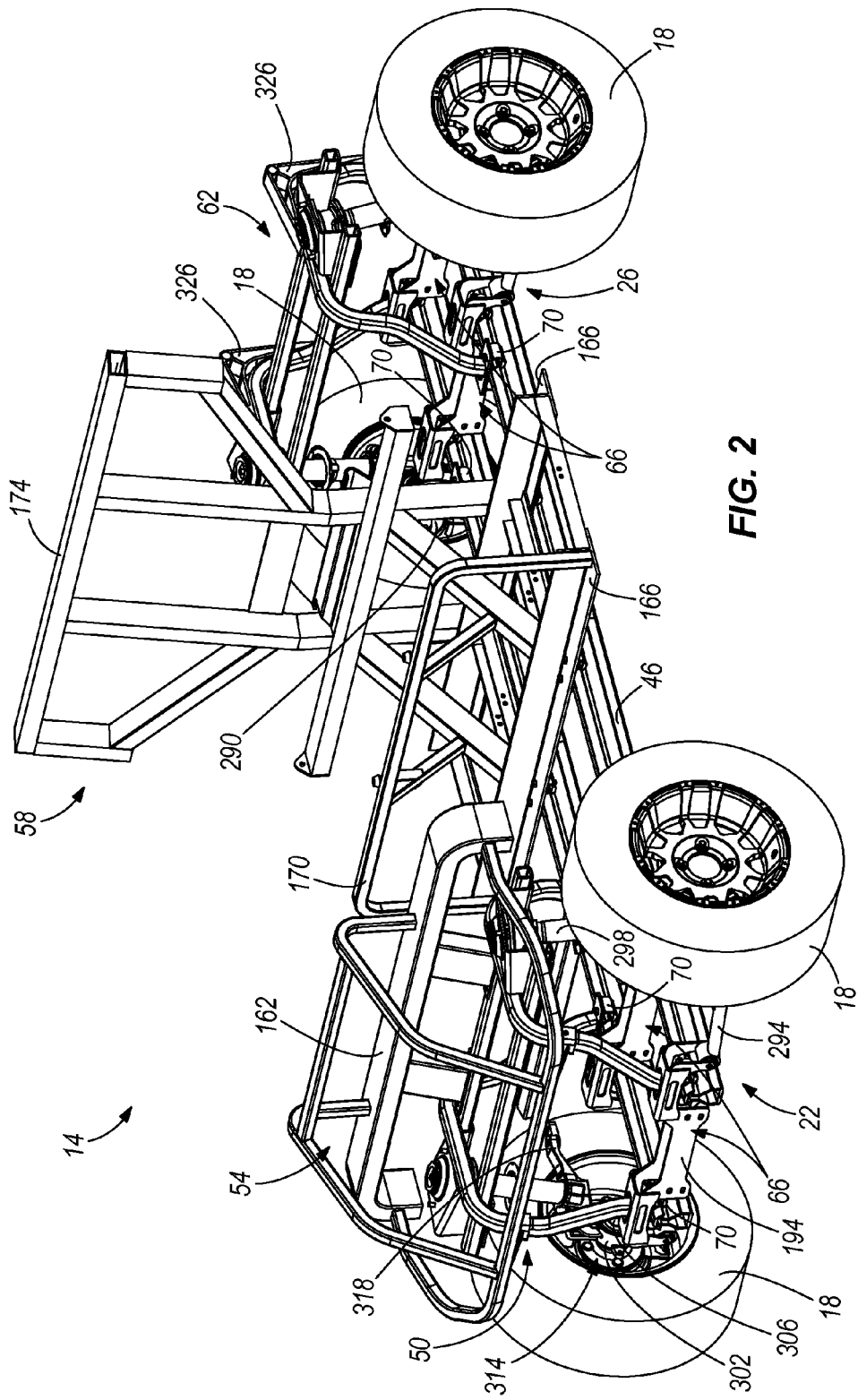
FIG. 2 is a perspective view of the vehicle of FIG. 1 with a shell and occupant interface removed.

FIG. 2 shows the vehicle 10 with the shell 34 removed so that the frame 14 is clearly visible. The frame 14 includes, frame rails 46, a front frame module 50, a front body module 54, an occupant frame module 58, a rear frame module 62, suspension cross members 66, and adapters 70 for connecting the various modules to the frame rails 46.

Figure 4:
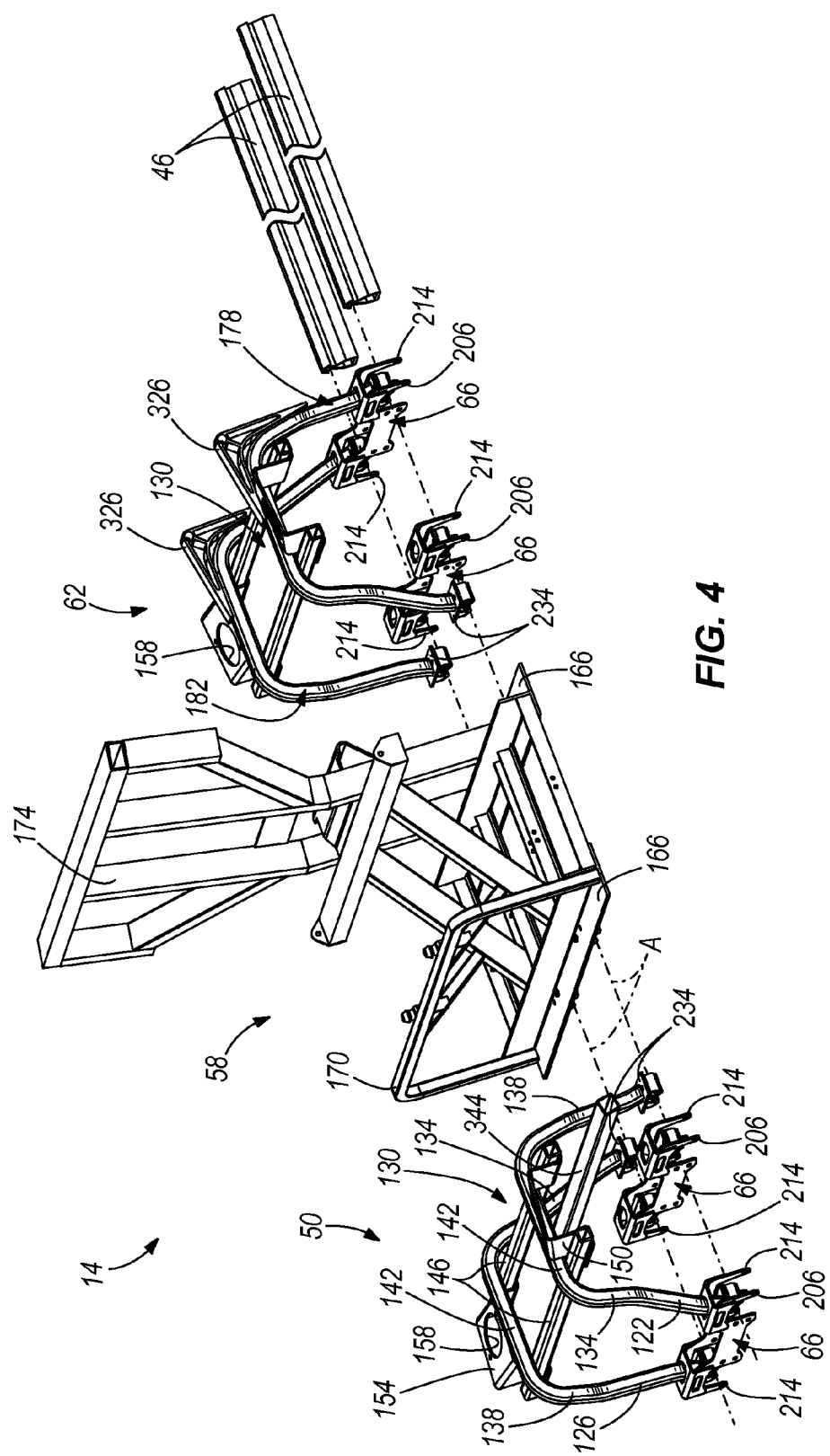
FIG. 4 is an exploded view of the frame of the vehicle of FIG. 1.

Turning to FIG. 4, the frame rails 46 are formed of an extruded or rolled metal frame rail stock 46 and provide the base of the frame 14 to which the other components are mounted. The frame rails 46 may be said to be made with a continuous process, meaning extruding, roll-forming, or any other process by which frame rail is manufactured with the desired profile in a single process (i.e., no after machining required) for substantially any length of rail. The illustrated frame 14 includes a left frame rail 46 and a right frame rail 46 that extend along a longitudinal axis A of the vehicle 10 and define a front portion 74, a middle portion 78, and a rear portion 82 (see FIG. 6). The left and right frame rails 46 are identical to each other.

Figure 9:
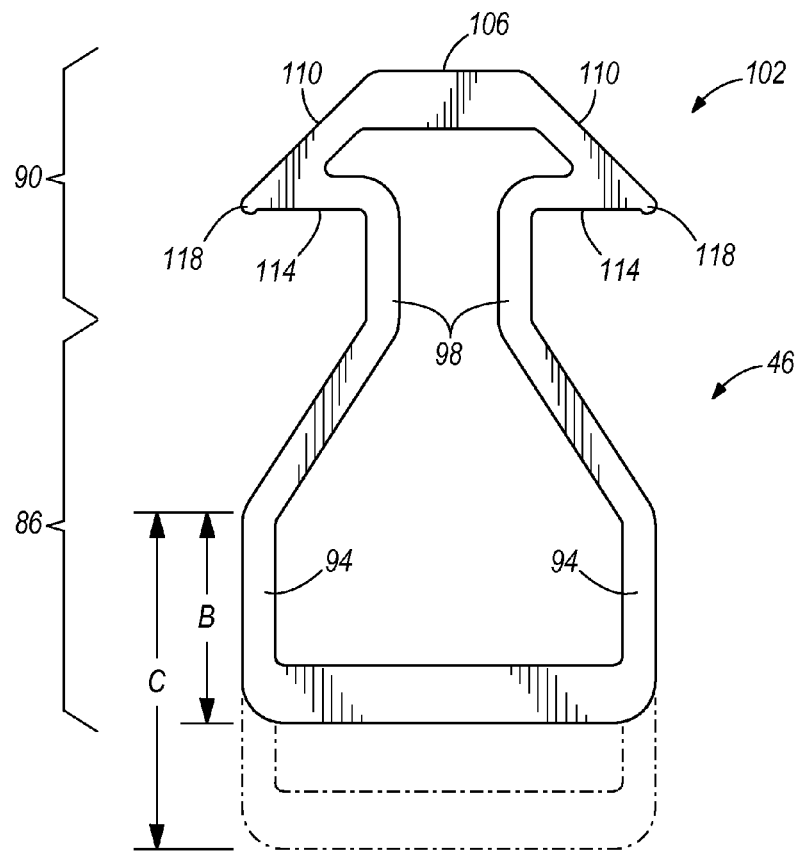
FIG. 9 is a section view of the frame rail of FIG. 7.
Figure 10:
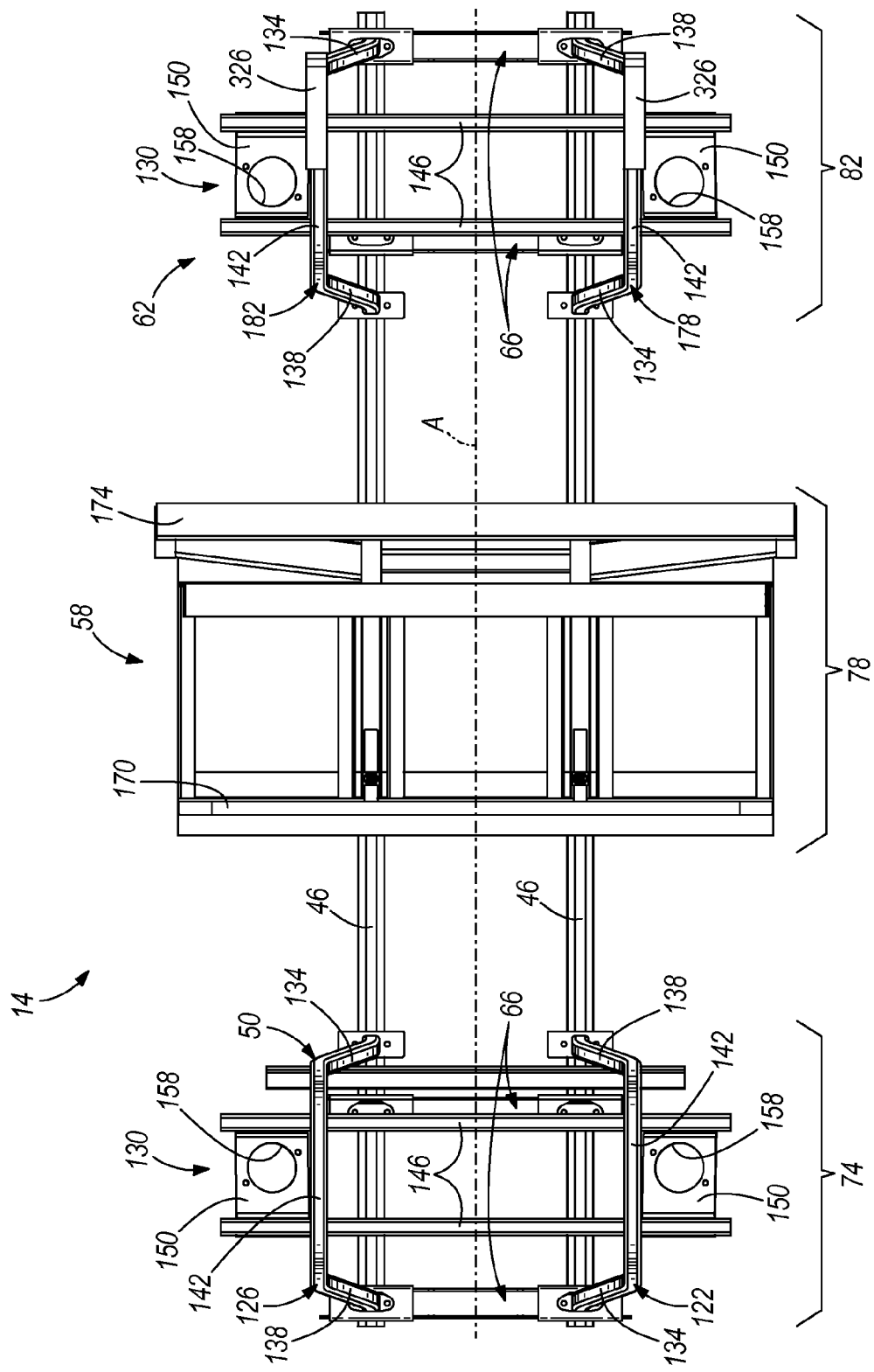
FIG. 10 is a top view of the frame shown in FIG. 4.

FIG. 9 shows a cross sectional view of the frame rail stock 46. The frame rail stock 46 includes a base portion 86 and a mating structure 90. The base portion 86 defines side walls 94 that provide rigidity to the frame rails 46 along the length of the vehicle 10. The side walls 94 define a rail base height or profile. The frame rails 46 may be manufactured with a base height that achieves a desired structural property. For example, a first pair of frame rails may be manufactured with a base height B for use on a standard passenger vehicle 10, such as that shown in FIG. 1, and a second pair of frame rails may be manufactured with a base height C for use on a longer, wider, or generally larger vehicle (not shown) to provide a stronger or more rigid frame 14 as required by a larger vehicle. The frame rail 46 with the first rail base height B is a low-capacity frame rail with a first section modulus, and the frame rail 46 with the second rail base height C is a high-capacity frame rail with a second section modulus that is higher than the first section modulus.

The mating structure 90 of the frame rail stock 46 includes a neck 98 that is narrower than the base portion 86, and a head 102 that defines a top surface 106, two download surfaces 110 arranged obliquely relative to the top surface 106, and two upload surfaces 114. A lip 118 is formed between each download surface 110 and the upload surface 114 on the same side of the rail. The illustrated frame rail stock 46 is an aluminum extrusion and defines a consistent profile or cross section (as shown in FIG. 9) along the entirety of its length. The left and right frame rails 46 are cut to the desired length from the frame rail stock 46. Alternatively, the frame rail stock 46 is formed in lengths equal to the desired lengths of the left and right rail stock 46. In other constructions, a weldment or another manufacture process may be used to create the frame rail stock 46. Further, the frame rail stock 46 may be formed of a different material such as steel, composite, or other suitable material, as desired.

As best shown in FIG. 4, the front frame module 50 includes a left front suspension hoop 122, a right front suspension hoop 126, and a front suspension cross assembly 130. The left front suspension hoop 122 is identical to the right front suspension hoop 126. Each front suspension hoop 122, 126 includes a first leg 134, a second leg 138, and a connecting section 142 connecting the first leg 134 to the second leg 138. The first leg 134 and the second leg 138 each include a compound bend. The first leg 134 is identical to the second leg 138, and each front suspension hoop 122, 126 is symmetrical about a vertical plane that is perpendicular to the longitudinal center plane of the vehicle and bisects the connecting sections 142 (i.e., the front half of each front suspension hoop 122, 126 is a mirror image of the rear half). The illustrated first leg 134, connecting section 142, and the second leg 138 are a weldment of substantially square tube. The left front suspension hoop 122 is rotated with respect to the right front suspension hoop 126 about a vertical axis defined in the center of the front frame module 50 so that the first leg 134 of the left front suspension hoop 122 is forward and the second leg 138 of the right front suspension hoop 126 is forward. Because the front suspension hoops 122, 126 are identical to each other and symmetrical, the left front suspension hoop 122 and the right front suspension hoop 126 are mirrored about the longitudinal center plane of the vehicle 10.

The front suspension cross assembly 130 includes two cross bars 146 connected between the connecting section 142 of the left front suspension hoop 122 and the right front suspension hoop 126, a first shock absorber mounting plate 150 mounted to the cross bars 146 adjacent the left front suspension hoop 122, and a second shock absorber mounting plate 154 mounted to the cross bars 146 adjacent the right front suspension hoop 126. The illustrated cross bars 146 define a length longer than a width between the left front suspension hoop 122 and the right front suspension hoop 126 such that a portion of each cross bar 146 extends outward of the respective suspension hoop 122,126. The cross bars 146 are welded to the suspension hoops 122, 126 and the shock absorber mounting plates 150, 154 are attached to the free ends of the cross bars 146 outboard of the suspension hoops 122, 126.

Figure 3:
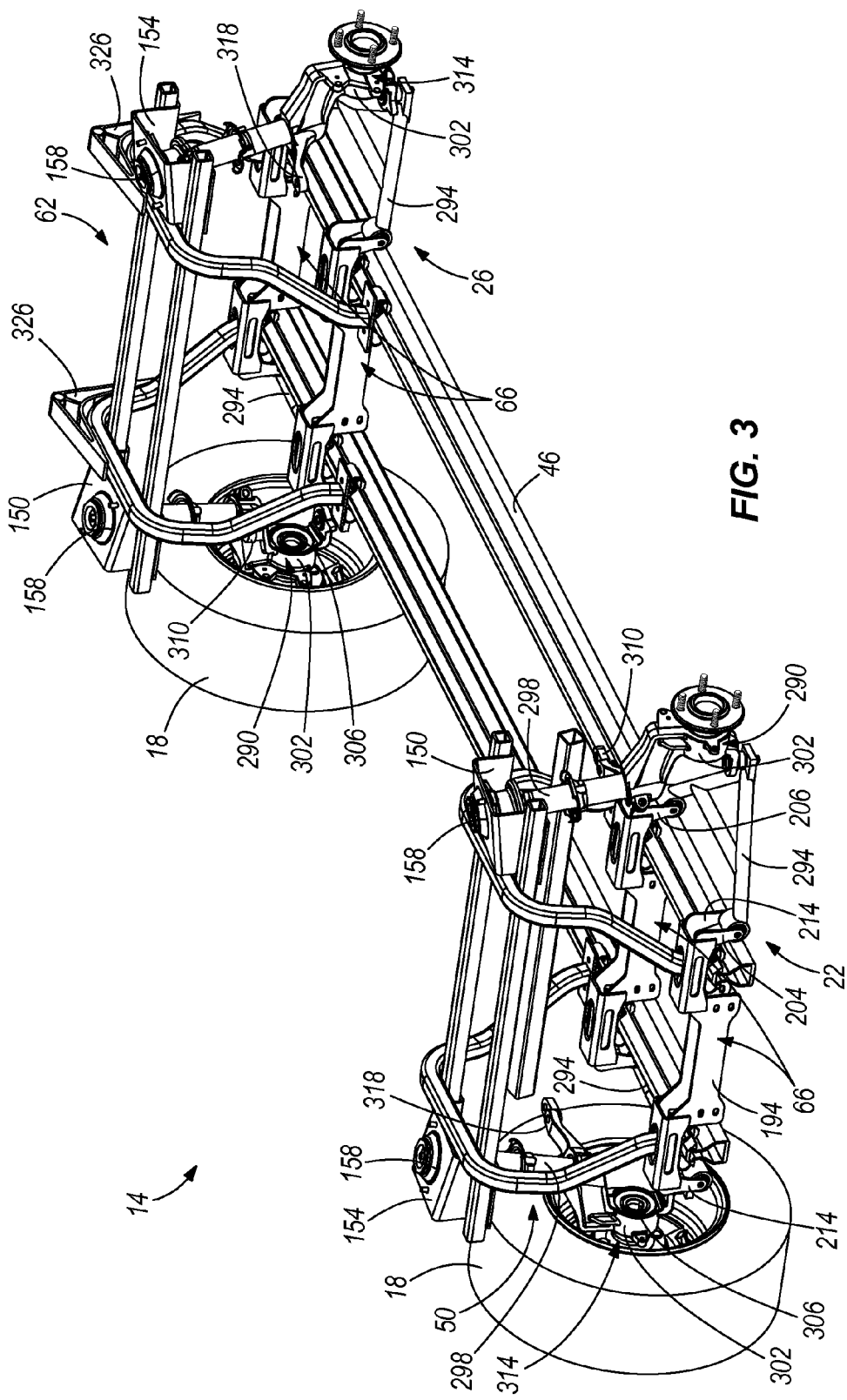
FIG. 3 is a perspective view of the vehicle of FIG. 1 more clearly showing a suspension system.

The first shock absorber mounting plate 150 and the second shock absorber mounting plate 154 are mirror images of one another. That is to say they are not identical, but have the same features and dimensions but are mirrored and therefore not interchangeable. As best shown in FIGS. 3 and 4, the first shock absorber mounting plate 150 includes tabs that are welded to the cross bars 146 and a raised portion that extends above a top surface 106 of the cross bars 146 and defines a shock absorber aperture 158 and several fastener apertures. The illustrated raised portion is arranged at an oblique angle with respect to the longitudinal centerline of the vehicle 10 and with respect to a front back direction of the vehicle 10. In other constructions, the first and second shock absorber mounts 150, 154 may be identical.

The front body module 54 is best viewed in FIG. 2. and includes a frame work that defines the shape of the front of the vehicle 10 and a dashboard mounting bar 162. The front body module 54 is fastened to the front frame module 50. In other constructions, the front body module 54 may be coupled to the vehicle 10 in another way (e.g., welding) or be connected to a different element (e.g., the frame rails 46), as desired.

The occupant frame module 58 includes a base in the form of feet 166, a front bar 170, a back support 174, and connecting members between the front bar 170 and the back support 174. In other constructions, the occupant frame module 58 may be arranged differently to support a desired occupant area layout.

The rear frame module 62 is identical to the front frame module 50 and is rotated about a vertical axis one-hundred-eighty degrees relative to the front frame module 50. In other words, when the rear frame module 62 and the front frame module 50 are arranged on the frame 14, they are mirror images of one another about the transverse center plane. With reference to FIG. 4, the rear frame module 62 includes a left rear suspension hoop 178 and a right rear suspension hoop 182. The left front suspension hoop 122, the right front suspension hoop 126, the left rear suspension hoop 178, and the right rear suspension hoop 182 are identical to each other. The rear frame 14 also includes a suspension cross assembly 130 identical to the suspension cross assembly 130 of the front frame module 50.

Figure 5:
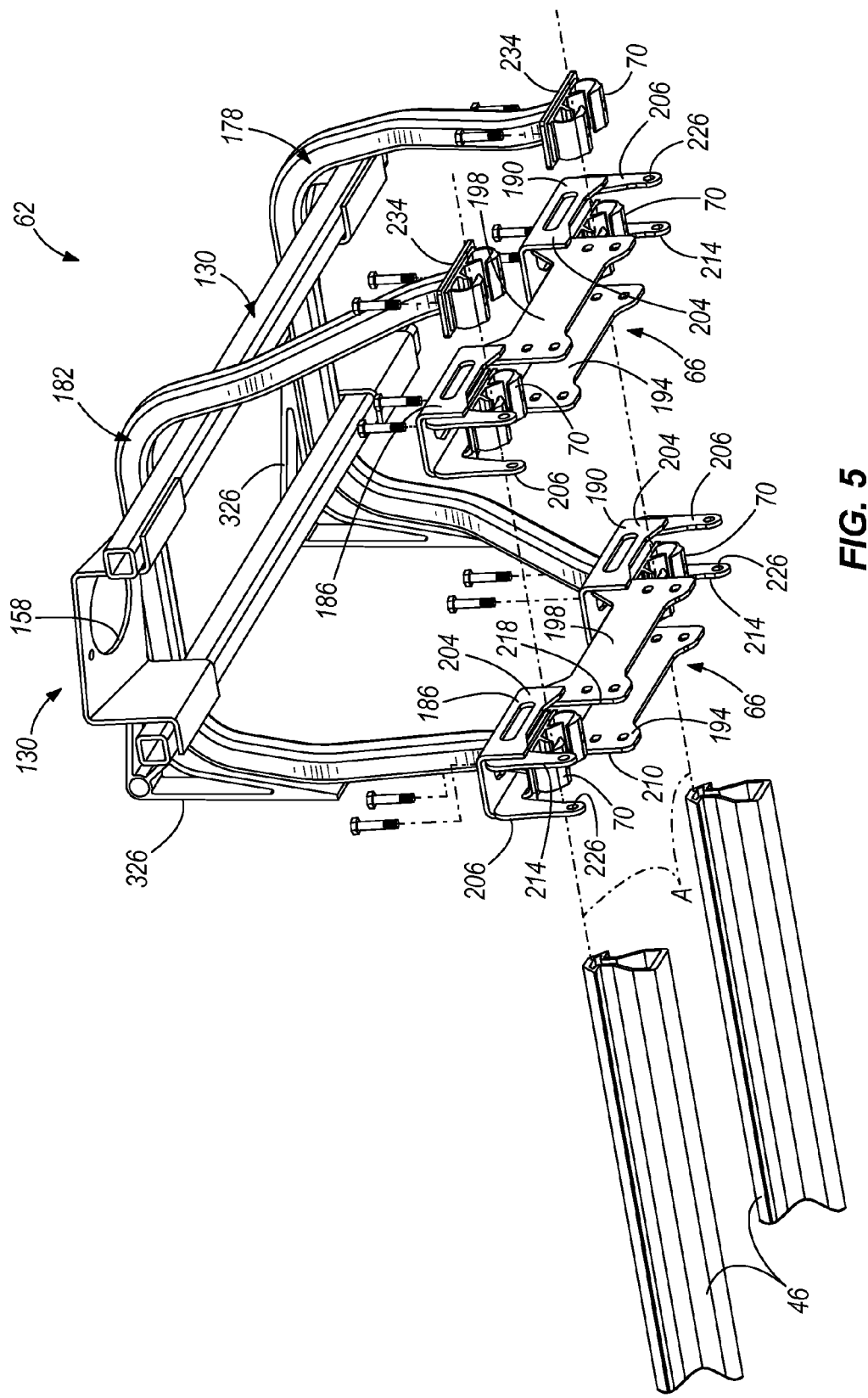
FIG. 5 is an exploded detail view of a rear frame module of the frame shown in FIG. 4.
Figure 6:
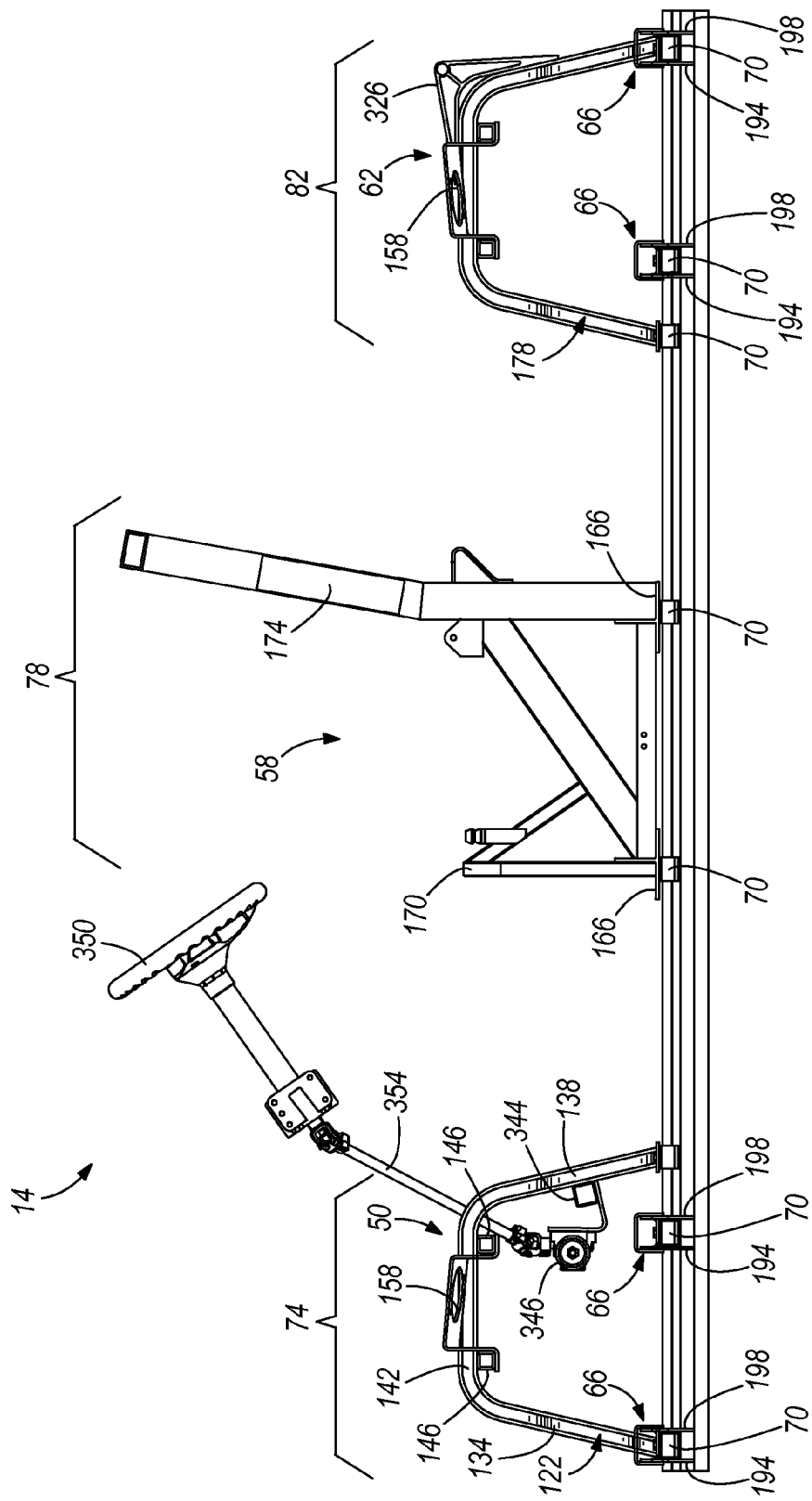
FIG. 6 is a side view of the frame of FIG. 4.

With reference to FIGS. 4-6 the illustrated vehicle 10 includes four suspension cross members 66 and each suspension cross member includes a first bracket 186, a second bracket 190, a first plate 194, and a second plate 198. The first bracket 186 is identical to the second bracket 190 and each define a top portion with an aperture 202, and two downwardly extending tabs 204.

Figure 7:
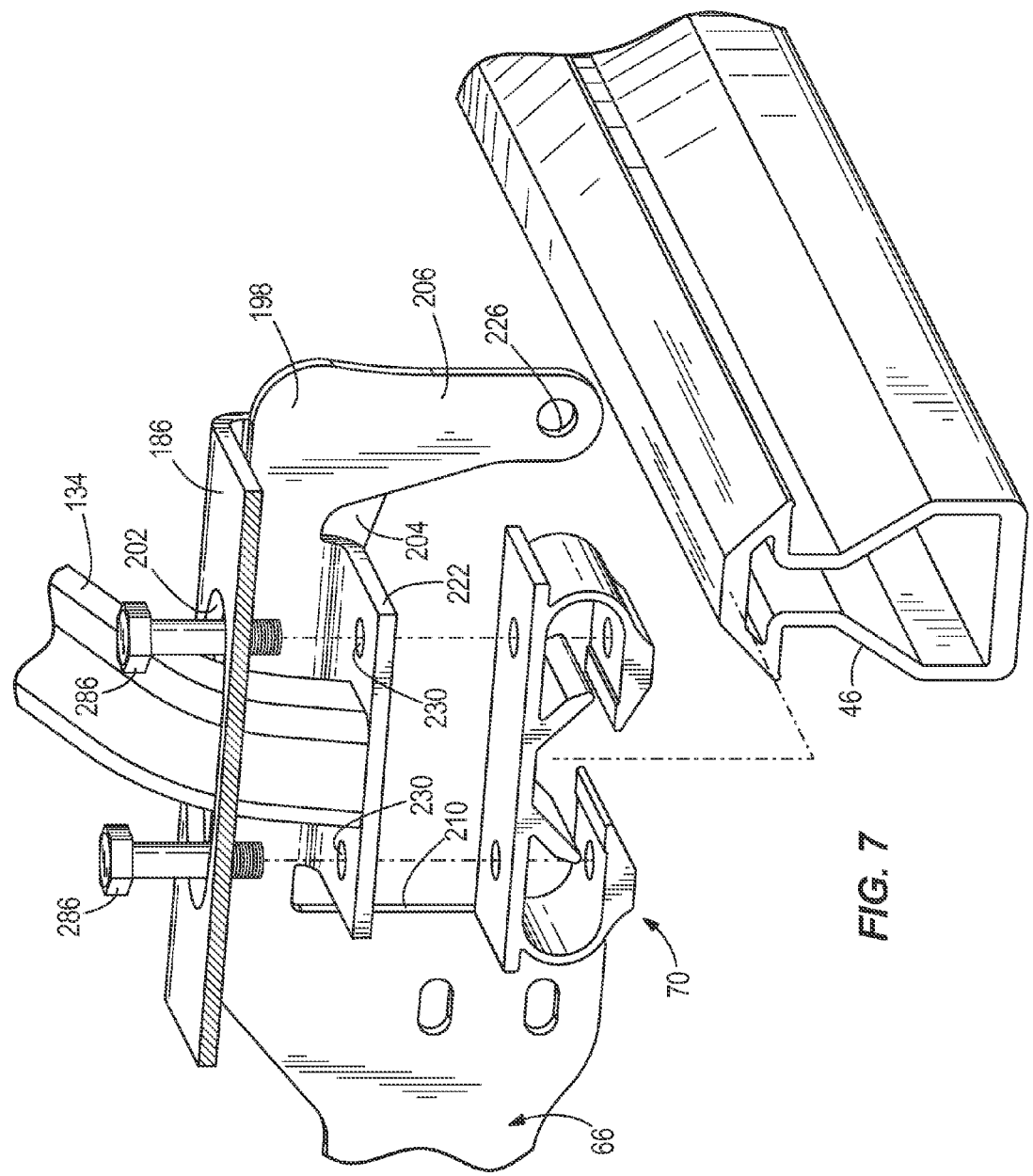
FIG. 7 is an exploded detail view of the connection between the rear frame module and a frame rail of the frame of FIG. 4.

Turning to FIGS. 5 and 7, the first plate 194 defines a first finger 206, a first cutaway portion 210 (see FIG. 7), a second finger 214, a second cutaway portion 218, and a tab 222. Each finger 206, 214 defines an aperture 226. With reference to FIG. 7, the tab 222 extends from the first cutaway portion 210 perpendicular to the first plate 194 and defines two apertures 230. No tab extends from the second cutaway portion 218.

The second plate 198 is identical to the first plate 194 and in the assembled suspension cross member 66 the second plate 198 is rotated one-hundred-eighty degrees relative to the first plate 194 such that a tab 222 is positioned at each end of the suspension cross member 66. The first plate 194, the second plate 198, the first bracket 186, and the second bracket 190 are welded together to form the suspension cross member 66. The apertures 226 formed in the fingers 206, 214 are aligned when the suspension cross member 66 is assembled.

FIG. 4 shows the frame 14 of the vehicle 10, including the four suspension cross members 66. A first suspension cross member 66 is positioned adjacent the front most legs of the front frame module 50. In fact, the front legs 134, 138 of the front frame module 50 extend through the apertures 202 in the first bracket 186 and are welded to the tabs 222 of the first suspension cross member 66 (see FIG. 7). A second suspension cross member 66 is positioned rearward of the first suspension cross member 66 but forward of the rearward legs 138, 134 of the front frame module 50. A third suspension cross member 66 is positioned rearward of the forward legs of the rear frame module 62. A fourth suspension cross member 66 is positioned adjacent the rear most legs of the rear frame module 62, with the rearward feet of the rear frame module 62 extending through the apertures 202 in the first bracket 186 and welded to the tabs 222 of the fourth suspension cross member 66.

FIG. 4 shows rectangular feet 234 that define two apertures with the same spacing as the apertures 230 formed in the tabs 222 are welded to the rearward legs 134, 138 of the front frame module 50 and the forward legs 134, 138 of the rear frame module 62. Additionally, the tabs 222 of the suspension cross members 66 may be removed and the suspension cross members 66 mounted to the frame 14 in another way. The front frame module 50 and the rear frame module 62 may include four feet 234. The tabs 222 may be considered feet, the first and second suspension cross members 66 may be considered elements of the front frame module 50, and the third and fourth suspension cross members 66 may be considered elements of the rear frame module 62.

Figure 8:
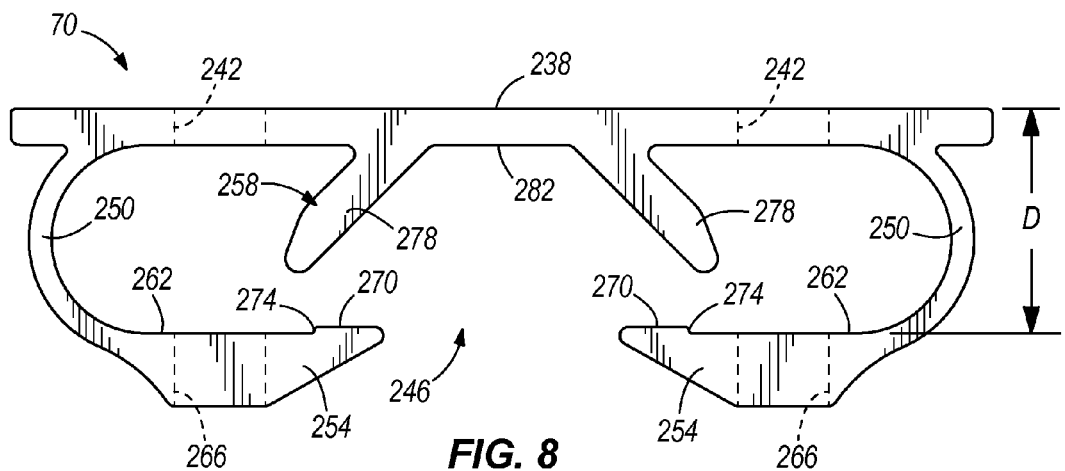
FIG. 8 is a section view of an adapter.

The front frame module 50, the occupant frame module 58, the rear frame module 62, and the suspension cross members 66 are coupled to the left and right frame rails 46 by the adapters 70. FIG. 7 is an exploded view of one adapter 70 coupled to the tab 222 of a suspension cross member 66. FIG. 8 shows a cross sectional view of the adapter 70. Each adapter 70 includes a mounting surface 238 that defines two clearance apertures 242, and a receiving structure 246 that is adapted to couple to the frame rails 46. The receiving structure 246 includes side walls 250, upload elements 254, and download structure 258.

The side walls 250 each define a curved and deformable body that connects the mounting surface 238 to one upload element 254. Each upload element 254 includes a bottom wall 262 that defines a threaded aperture 266 substantially aligned with the corresponding clearance aperture 242 defined in the mounting surface 238. Each upload element 254 further defines a raised portion 270 arranged to engage the upload surface 114 of the frame rail 46 and a shoulder 274 at the edge of the raised portion 270. A gap D is defined between the bottom wall 262 and the mounting surface 238.

The download structure 258 includes two arms 278 and a top surface 282. The two arms 278 depend downward from the mounting surface 238 at oblique angles that correspond to the angles of the download surfaces 110 of the frame rail 46. The top surface 282 of the download structure 258 defines a width less that a width of the top surface 106 of the frame rail 46.

Assembly of the frame 14 will be described hereafter with reference to FIG. 4. Adapters 70 are fit to the bottom of each tab 222 on the suspension cross members 66 and onto the feet 234 of both the front frame module 50 and the rear frame module 62, and four adapters 70 are fastened to the feet 166 of the occupant frame module 58. To assemble the frame 14, adapters 70 associated with the front frame module 50, the occupant frame module 58, and the rear frame module 62 are slid axially onto the left frame rail 46 and the right frame rail 46 such that the receiving structure 246 of the adapters 70 are engaged with the mating structure 90 of the frame rails 46. The front frame module 50 is coupled to the front portion 74 of the frame rails 46, the occupant frame module 58 is coupled to the middle portion 78 of the frame rails 46, and the rear frame module 62 is mounted to the rear portion 82 of the frame rails 46. Alternatively, the adapters 70 may be slid axially onto the frame rails 46 first then the various components attached thereto.

With reference specifically to FIG. 7, fasteners 286 are passed through the clearance apertures 230 in the feet 234 and tabs 222, through the apertures 242 formed in the mounting surface 238, and are threaded into the threaded apertures 266 in the upload elements 254. The fasteners 286 are then tightened and the bottom wall 262 is brought toward the mounting surface 238 to decrease the gap D such that the download structure 258 of each adapter 70 comes into contact with the download surfaces 110 of the left and right frame rails 46, and the upload elements 254 come into contact with the upload surfaces 114 of the left and right frame rails 46. In other words, the fasteners 286 deflect the side walls 250 and clamp the mating structure 90 of the frame rail 46 between the upload elements 254 and download structures 258 of the adapters 70. The fasteners 286 bear the spring force of the side walls 250 with a tension load on the fasteners 286. Once tightened, the adapters 70 resist movement along the frame rails 46 in the axial direction and in all directions transverse to the frame rails 46 longitudinal axis A.

The download structure 258 is compressed against the download surfaces 110 of the frame rail 46 such that weight from the vehicle 10 is transferred to the frame rails 46 via the download structure 258. Because the top surface 106 of the frame rail 46 is wider than the top surface 282 of the download structure 258, there is no contact between the top surface 106 and the top surface 282 and no weight is borne by the top surface 106 of the frame rail 46.

The upload elements 254 are compressed against the upload surfaces 114 of the frame rail 46 such that the adapters 70 are maintained engaged to the frame rail 46 when an uploading occurs, such as after a large bump or a sudden drop. The shoulders 274 of the upload elements 254 engage the lips 118 of the frame rails 46 in the event of excessive lateral loading.

Turning to FIG. 3, the front suspension assembly 22 includes a left front suspension assembly and a right front suspension assembly, and the rear suspension assembly 26 includes a left rear suspension assembly and a right rear suspension assembly. The left front suspension assembly includes a first knuckle 290, a control arm 294, and a shock absorber 298. The first knuckle 290 defines a hub 302 that houses a bearing 306 and includes a steering arm 310 that extends rearward of the hub 302. The wheel 18 is rotatably supported by the bearing 306 and mounted to the hub 302. The control arm 294 is mounted between a lower portion of the hub 302 and the aligned apertures 226 in the fingers 206, 214 of the first and second suspension cross members 66. The illustrated shock absorber 298 is a strut that is rigidly mounted between an upper portion of the hub 302 and the shock absorber aperture 158 of the first shock absorber mounting plate 150. In other constructions, the shock absorber 298 may be pivotably mounted and a second control arm installed, as desired. The illustrated shock absorber 298 is a spring damper system, but could be replaced with another type of shock absorber, as desired.

The right front suspension assembly includes a second knuckle 314, a control arm 294, and a shock absorber 298. The control arm 294 and the shock absorber 298 are identical to the control arm 294 and shock absorber 298 of the left front suspension assembly. The second knuckle 314 is a mirror image of the first knuckle 290 about the longitudinal center plane of the vehicle 10. That is to say, the hub 302 of the second knuckle 314 is identical to the hub 302 of the first knuckle 290, but a steering arm 318 of the second knuckle 314 extends from the hub 302 in a direction opposite the steering arm 310 of the first hub 302 such that when installed on the right side of the vehicle 10, the steering arm 318 extends rearwardly. The right front suspension assembly is assembled in the same manner as the left front suspension assembly.

The left rear suspension assembly is identical to the right front suspension assembly and is rotated one-hundred-eighty degrees about a vertical axis through the center of the vehicle 10 such that the steering arm 318 of the second knuckle 314 extends forward. The left rear suspension assembly is assembled in the same manner as the right front suspension assembly.

The right rear suspension assembly is identical to the left front suspension assembly and is rotated one-hundred-eighty degrees relative to the vehicle 10 such that the steering arm 310 of the first knuckle 290 extends forward. The right rear suspension assembly is assembled in the same manner as the left front suspension assembly.

With reference to FIGS. 1 and 2, the cargo bed assembly 30 is installed on the vehicle 10 and includes a cargo bed 322, and hinge brackets 326 welded to the rear frame module 62 to rotatably support the cargo bed 322. The hinge brackets 326 are identical and are welded to the left rear suspension hoop 178 and the right rear suspension hoop 182. Alternatively, the hinge brackets 326 could be fastened to the rear frame module 62 or attached to a different component of the rear frame module 62. Additionally, the cargo bed 322 can be rigidly mounted on the vehicle 10 such that it does not rotate.

FIG. 1 shows the shell 34 mounted to the frame 14 and covering the vehicle 10. The shell 34 includes decorative panels and various features that add to the aesthetic look of the vehicle 10 while covering the internal systems and components of the vehicle 10.

The occupant interface 38 includes a floor 330 mounted to the frame 14, a seat 334 mounted to the front bar 170 and the back support 174, a steering assembly 338, pedals (not shown) for controlling the speed of the vehicle 10, and a dashboard 342 coupled to the dashboard mounting bar 162. All the systems and components located within reach of the occupants (driver and/or passenger) define an operator zone. Within the operator zone, the occupants can operate the vehicle 10 systems. For example, the driver may depress the pedals to speed up or slow the vehicle 10, may interact with the dashboard 342 to turn the vehicle 10 on/off, operate the lights, or honk a horn. The steering assembly 338 allows the driver to steer the vehicle 10, as desired.

The steering assembly 338 includes a steering rack support bar 344 welded to the front frame module 50 and supporting a steering transmitter in the form of a steering rack 346, a steering wheel 350, a steering column 354 coupled between the steering rack 346 and the steering wheel 350, and tie rods (not shown) connecting the steering rack 346 to the steering arms 310, 318 of the first and second knuckles 290, 314. The illustrated steering assembly 338 provides four-wheel steering but may be altered to provide two-wheel steering.

The illustrated vehicle 10 also includes roll bars 42. Exemplary vehicles may also include a windshield, a roof, or other components, as desired.

Various features and advantages of the invention are set forth in the following claims.

What is claimed is:

1. A frame assembly for an off-road vehicle, the frame assembly comprising:
   a left frame rail and a right frame rail, the left and right frame rails being identical to each other, each of the left and right frame rails having a base portion and a mating structure, each of the left and right frame rails being straight and extending along respective left and right longitudinal axes, such that the left and right frame rails each have a constant cross-section along its entire length;
   a plurality of identical adapters mounted to the left and right frame rails, each adapter including a mounting surface and a receiving structure receiving the mating structure of one of the frame rails;
   a front frame module including at least one left foot and at least one right foot, the at least one left foot of the front frame module being mounted to the mounting surface of an adapter mounted to the left frame rail, and the at least one right foot of the front frame module being mounted to the mounting surface of an adapter mounted to the right frame rail;
   a occupant frame module including at least one left foot and at least one right foot, the at least one left foot of the occupant frame module being mounted to the mounting surface of an adapter mounted to the left frame rail, and the at least one right foot of the occupant frame module being mounted to the mounting surface of an adapter mounted to the right frame rail; and a rear frame module including at least one left foot and at least one right foot, the at least one left foot of the rear frame module being mounted to the mounting surface of an adapter mounted to the left frame rail, and the at least one right foot of the rear frame module being mounted to the mounting surface of an adapter mounted to the right frame rail.

2. The frame assembly of claim 1, wherein the front frame module comprises: a left suspension hoop including the first and second left feet; a right suspension hoop identical to the left suspension hoop and including the first and second right feet; and a suspension cross assembly interconnecting the left and right suspension hoops.

3. The frame assembly of claim 2, wherein each of the left and right suspension hoops includes first and second leg sections extending up from the respective first and second feet, and a connecting section interconnecting the first and second leg sections.

4. The frame assembly of claim 1, wherein the rear frame module is identical in parts and assembly to the front frame module.

5. The frame assembly of claim 1, wherein the mating structure of the left and right frame rails extends upwardly from the base portion; and wherein the receiving structure of each adapter extends downwardly from the a mounting surface.

6. The frame assembly of claim 1, wherein the receiving structure of each adapter is installed on the mating structure of a frame rail in an axial direction; wherein the mating structure of the rail supports the adapter to bear loads perpendicular to the longitudinal axis directed toward the longitudinal axis; and wherein the mating structure retains the adapter to resist movement of the adapter away from the longitudinal axis.

7. The frame assembly of claim 1, wherein the receiving structure of each adapter includes a bottom wall defining a threaded hole; wherein the mounting surface of each adapter includes a clearance aperture aligned with the threaded hole; wherein a gap is defined between the bottom wall and the mounting surface; wherein each adapter further includes a fastener including a threaded end and a head; wherein each adapter is secured to a frame rail by extending the fastener through the clearance aperture and threading the threaded end into the threaded hole, such that the head of the fastener bears against the mounting surface and the bottom wall is drawn toward the mounting surface to decrease the gap.

8. The frame assembly of claim 1, further comprising a front suspension assembly comprising: first and second suspension cross members, each extending perpendicular to the left and right frame rails and mounted to an adapter on each of the left and right frame rails, the first and second suspension cross members being parallel to each other and axially spaced from each other, each of the first and second suspension cross members including left and right ends; a left suspension assembly including a left knuckle, a left control arm interconnecting the left knuckle to the left ends of each of the first and second suspension cross members, a left shock absorber interconnecting the left knuckle with the front frame module, and a left wheel supported for rotation within the left knuckle; and a right suspension assembly including a right knuckle, a right control arm identical to the left control arm, a right shock absorber identical to the left shock absorber, and a right wheel identical to the left wheel, the right suspension assembly assembled identically to the left suspension assembly but interconnected to the right ends of the first and second suspension cross members.

9. The frame assembly of claim 8, further comprising a rear suspension assembly identical to the front suspension assembly.

10. A method of assembling a vehicle frame comprising:
providing a plurality of identical frame rails, each frame rail including a base portion having a section modulus and a mating portion on top of the base portion;
providing a plurality of identical adapters, each adapter having a mounting surface and a receiving structure adapted to receive the mating structure of the frame rails;
providing identical front and rear frame modules, the front frame module including at least one left foot and at least one right foot, the rear frame module including at least one left foot and at least one right foot;
providing symmetrically identical front and rear suspension assemblies;
selecting left and right frame rails, each of the left and right frame rails being straight and extending along respective left and right longitudinal axes such that the left and right frame rails each have a constant cross-section along its entire length;
positioning the left and right frame rails parallel to each other with the mating portions above the base portions;
mounting a plurality of the adapters to the mating portions of the left and right frame rails;
mounting the at least one left foot and the at least one right foot of the front frame module to the mounting surfaces of the adapters on the left and right frame rails;
mounting the at least one left foot and the at least one right foot of the rear frame module to the mounting surfaces of the adapters on the left and right frame rails;
mounting an occupant frame module to the adapters on the left and right frame rails;
mounting the front suspension assembly to the adapters on the left and right frame rails; and
mounting the rear suspension assembly to the adapters on the left and right frame rails.

11. The method of claim 10, wherein providing a plurality of identical frame rails comprises: providing a plurality of identical low-capacity frame rails including a base portion having a low-capacity section modulus; and providing a plurality of identical high-capacity frame rails, each high-capacity frame rail including a base portion having a high-capacity section modulus greater than the low-capacity section modulus and a mating portion that is identical to the mating portion of the low-capacity frame rails;
wherein selecting left and right frame rails includes selecting left and right low-capacity frame rails for a low-capacity vehicle or selecting left and right high-capacity frame rails for a high-capacity vehicle.

12. The method of claim 11, wherein providing a plurality of identical adapters includes providing adapters having receiving structure adapted to receive the mating structure of the low-capacity frame rails and the high-capacity frame rails.

13. The method of claim 10,
wherein providing identical front and rear frame modules comprises: providing a plurality of identical suspension hoops, each suspension hoop including first and second feet;
providing a plurality of identical suspension cross members; and interconnecting a pair of suspension hoops to a suspension cross member;

wherein mounting the front frame module includes mounting the first and second feet of one of the suspension hoops to a pair of adapters in the front portion of the left frame rail, and mounting the first and second feet of the other suspension hoop to a pair of adapters in the front portion of the right frame rail; and wherein mounting the rear frame module includes mounting the first and second feet of one of the suspension hoops to a pair of adapters in the rear portion of the left frame rail, and mounting the first and second feet of the other suspension hoop to a pair of adapters in the rear portion of the right frame rail.

14. The method of claim 10, wherein providing a plurality of adapters includes providing adapters that include a clearance aperture in the mounting surface, a bottom wall in the receiving portion, a threaded hole in the bottom wall aligned with the clearance aperture, a gap defined between the bottom wall and the mounting surface, and a fastener including a threaded end and a head; and wherein mounting a plurality of adapters includes extending the fastener through the clearance aperture and threading the threaded end into the threaded hole, such that the head of the fastener bears against the mounting surface and the bottom wall is drawn toward the mounting surface to decrease the gap and clamp the frame mating structure within the receiving structure of the adapter.

\* \* \* \* \*